US012510953B2

United States Patent
Lior et al.

(10) Patent No.: US 12,510,953 B2
(45) Date of Patent: Dec. 30, 2025

(54) POWER-AWARE JOB PLACEMENT BASED ON AVAILABLE POWER AND EXPECTED POWER DEMAND

(71) Applicant: Mellanox Technologies, Ltd., Yokneam (IL)

(72) Inventors: Ayal Josef Lior, Kiryat Ono (IL); Ortal Bashan, Tel Aviv (IL)

(73) Assignee: Mellanox Technologies, Ltd, Yokneam (IL)

( * ) Notice: Subject to any disclaimer, the term of this patent is extended or adjusted under 35 U.S.C. 154(b) by 66 days.

(21) Appl. No.: 18/412,540

(22) Filed: Jan. 14, 2024

(65) Prior Publication Data

US 2025/0231610 A1    Jul. 17, 2025

(51) Int. Cl.
    *G06F 1/329*    (2019.01)
(52) U.S. Cl.
    CPC .................... *G06F 1/329* (2013.01)
(58) Field of Classification Search
    CPC ...... G06F 1/329; G06F 1/3293; G06F 1/3296; G06F 1/32; G06F 1/3203; G06F 1/3206; G06F 1/3268; G06F 1/3225; G06F 1/3221; G06F 1/3215; G06F 3/0625
    See application file for complete search history.

(56) References Cited

U.S. PATENT DOCUMENTS

| 10,747,286 B2 * | 8/2020 | Kaburlasos | G06F 1/3206 |
| 10,831,254 B2 * | 11/2020 | Priyadarshi | G06F 1/3206 |
| 2012/0084580 A1 * | 4/2012 | Harchol-Balter | G06F 9/5094 |
| | | | 713/310 |
| 2013/0318379 A1 * | 11/2013 | Seshadri | G06F 1/206 |
| | | | 713/320 |
| 2014/0298047 A1 * | 10/2014 | Holler | G06F 1/329 |
| | | | 713/300 |
| 2015/0006925 A1 * | 1/2015 | Branover | G06F 1/206 |
| | | | 713/320 |

* cited by examiner

*Primary Examiner* — Raymond N Phan
(74) *Attorney, Agent, or Firm* — Meitar Patents Ltd.; Daniel Kligler

(57) ABSTRACT

A controller includes an interface and a processor. The interface is to communicate with multiple processing devices. The processor is to determine respective amounts of available electrical power that are available in the processing devices for executing jobs, to select a group of one or more of the processing devices for executing a new job, based at least on (i) the amounts of available electrical power and (ii) an expected power demand needed for executing the new job, and to assign the selected group to execute the new job.

18 Claims, 2 Drawing Sheets

POWER-AWARE JOB PLACEMENT BASED ON AVAILABLE POWER AND EXPECTED POWER DEMAND

FIELD OF THE INVENTION

The present invention relates generally to management of computing systems, and particularly to methods and systems for power-aware assignment of jobs to processing devices.

BACKGROUND OF THE INVENTION

A typical computing system, such as a Data Center (DC) or a High-Performance Computing (HPC) cluster, comprises a large number of processing devices that communicate with one another over a data network. Processing devices may comprise, for example, Graphics Processing Units (GPUs), Central Processing Units (CPUs) or other processors. Processing tasks ("jobs") can be assigned to individual processing devices or to groups of processing devices.

SUMMARY OF THE INVENTION

An embodiment of the present invention that is described herein provides a controller including an interface and a processor. The interface is to communicate with multiple processing devices. The processor is to determine respective amounts of available electrical power that are available in the processing devices for executing jobs, to select a group of one or more of the processing devices for executing a new job, based at least on (i) the amounts of available electrical power and (ii) an expected power demand needed for executing the new job, and to assign the selected group to execute the new job.

In a disclosed embodiment, the processor is to determine the amounts of available electrical power by receiving power-availability reports from the processing devices. In an embodiment, each of the processing devices is to receive electrical power from one of a plurality of Power Distribution Units (PDUs) in accordance with a power distribution topology, and the processor is to select the group based also on the power distribution topology. In another embodiment, each of the processing devices is to receive electrical power from one of a plurality of Power Distribution Units (PDUs), and the processor is to select the group based also on amounts of available power of one or more of the PDUs. In an example embodiment, the new job is classified into a power demand category selected from among multiple power demand categories, and the processor is to select the group based on the power demand category of the new job.

There is additionally provided, in accordance with an embodiment of the present invention, a computing system including multiple processing devices and a controller. The controller is to determine respective amounts of available electrical power that are available in the processing devices for executing jobs, to select a group of one or more of the processing devices for executing a new job, based at least on (i) the amounts of available electrical power and (ii) an expected power demand needed for executing the new job, and to assign the selected group to execute the new job.

There is also provided, in accordance with an embodiment of the present invention, a method for assigning jobs to processing devices. The method includes determining respective amounts of available electrical power that are available in the processing devices for executing jobs. A group of one or more of the processing devices is selected for executing a new job, based at least on (i) the amounts of available electrical power and (ii) an expected power demand needed for executing the new job. The selected group is assigned to execute the new job.

The present invention will be more fully understood from the following detailed description of the embodiments thereof, taken together with the drawings in which:

DETAILED DESCRIPTION OF EMBODIMENTS

Overview

Embodiments of the present invention that are described herein provide improved methods and systems for assigning computing tasks to processing devices ("job placement"). In the disclosed embodiments, a computing system comprises multiple processing devices, e.g., Central Processing Units (CPUs) or Graphics Processing Units (GPUs), and a controller. The controller assigns computing tasks (referred to as "jobs") to processing devices in accordance with suitable criteria.

A possible approach would be to assign a new job to a processing device (or to a group of processing devices) based on availability of computational resources and/or physical proximity between processing devices. This approach, however, will not perform well in power-limited scenarios. In many practical implementations, the amounts of electrical power available to the processing devices can be the limiting factor in their ability to undertake new jobs. In such a case, even if a processing device (or group of processing devices) has sufficient available computational resources for executing a new job, it may lack available electrical power to do so.

In some embodiments that are described herein, the controller assigns new jobs while considering the amounts of electrical power that are available in the various processing devices for job execution. The disclosed techniques are therefore referred to as being "power aware". The controller may consider additional factors, e.g., availability of computational resources and physical proximity as described above, in addition to power availability. When the system is powered by multiple Power Distribution Units (PDUs) in accordance with a certain power distribution topology, the controller may consider the topology and/or the available electrical powers of the various PDUs.

In an example embodiment, the controller runs an ongoing process that tracks respective amounts of available electrical power that are available in the various processing devices for executing jobs. The controller may, for example, receive from the processing devices periodic reports that indicate their available electrical power. To assign a new job, the controller selects a group of one or more of the processing devices based at least on (i) the amounts of available electrical power and (ii) an expected power demand needed for executing the new job.

The disclosed power-aware job placement techniques are highly efficient in utilizing the available computational and energy resources of the system. Example scenarios that demonstrate this efficiency are discussed below.

System Description

Figure 1:
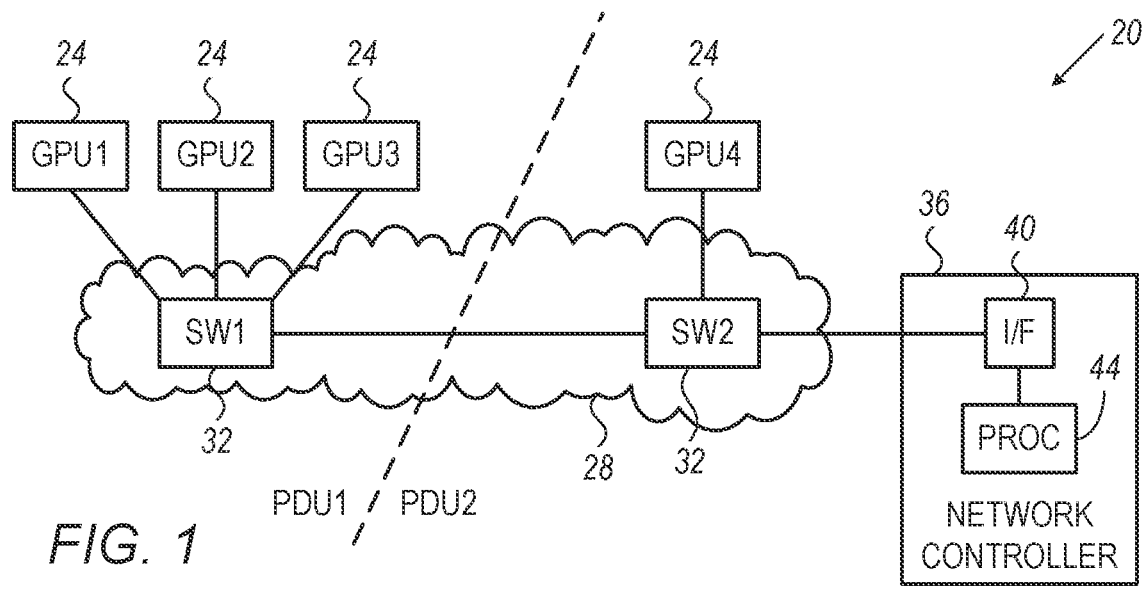
FIG. 1 is a block diagram that schematically illustrates a computing system employing power-aware job placement, in accordance with an embodiment of the present invention.

FIG. 1 is a block diagram that schematically illustrates a computing system 20 employing power-aware job placement, in accordance with an embodiment of the present invention. In the present example system 20 is a Data Center (DC). Generally, however, the disclosed techniques can be used in any other suitable computing system. System 20 comprises multiple Graphics Processing Units (GPUs) 24. In the present context, GPUs 24 are considered non-limited examples of processing devices. In alternative embodiments, system 20 may comprise any other suitable type of processing devices, such as CPUs or any other suitable device that can be assigned processing tasks ("jobs").

GPUs 24 (or other processing devices) communicate with one another over a network 28 comprising one or more switches 32. In some embodiments, network 28 is an InfiniBand™ network, and GPUs 24 and switches 32 communicate using the IB protocol. Alternatively, any other suitable network protocol, for example Ethernet, can be used.

System 20 is powered by one or more Power Distribution Units (PDUs). In the example of FIG. 1, system 20 comprises four GPUs 24 denoted GPU1 . . . GPU4, and two switches 32 denoted SW1 and SW2 ("SW" standing for "switch"). GPU1, GPU2, GPU3 and SW1 are powered by a PDU denoted PDU1. GPU4 and SW2 are powered by a different PDU, denoted PDU2. The assignment of processing devices to PDUs is referred to herein as the "power distribution topology" of the system. The portion of the system powered by a given PDU is sometimes referred to as the "power domain" of that PDU.

System 20 is managed by a network controller 36. Network controller 36 comprises an interface (I/F) 40 for communicating over network 28, and a processor 44 that carries out the various tasks of controller 36. Among other tasks, processor 44 assigns jobs to GPUs 24 in a power-aware manner.

The configuration of system 20, as shown in FIG. 1, is an example configuration that is chosen purely for the sake of conceptual clarity. In alternative embodiments, any other suitable configurations can be used. Elements that are not necessary for understanding the principles of the disclosed techniques have been omitted from the figures for clarity.

The various elements of system 20 may be implemented in hardware, e.g., in one or more Application-Specific Integrated Circuits (ASICs) or FPGAs, in software, or using a combination of hardware and software elements. In some embodiments, certain elements of system 20, e.g., some or all of the functions of processor 44, may be implemented, in part or in full, using one or more general-purpose processors, which are programmed in software to carry out the functions described herein. The software may be downloaded to any of the processors in electronic form, over a network, for example, or it may, alternatively or additionally, be provided and/or stored on non-transitory tangible media, such as magnetic, optical, or electronic memory.

Job Placement Based on Processing Device Power Availability

In many practical scenarios, it is advantageous to consider availability of electrical power when assigning jobs to GPUs. The following scenario demonstrates the advantage of considering the available power of both the GPUs and the PDUs.

Figure 2:
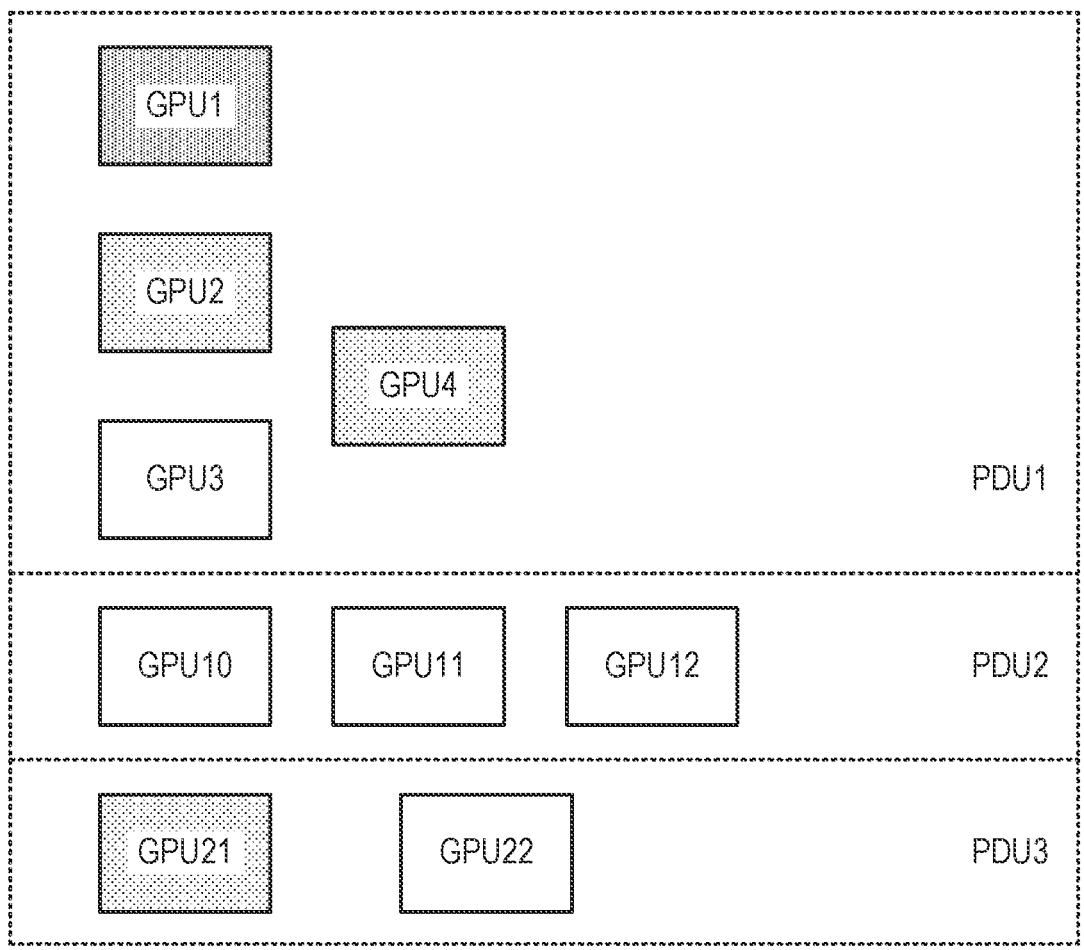
FIG. 2 is a diagram that schematically illustrates an example job placement scenario, in accordance with an embodiment of the present invention.

FIG. 2 is a diagram that schematically illustrates an example job placement scenario, in accordance with an embodiment of the present invention. In this example, the system comprises nine GPUs and three PDUs. Four GPUs denoted GPU1, GPU2, GPU3 and GPU4 are powered by a PDU denoted PDU1. Three GPUs denoted GPU10, GPU11 and GPU12 are powered by a PDU denoted PDU2. Two GPUs denoted GPU21 and GPU22 are powered by a PDU denoted PDU3.

At a given time, the various GPUs differ from one another in the amount of electrical power available for new jobs. In the present example, three levels of power availability are defined, visualized in the figure using different shading patterns:

GPU3, GPU10, GPU11 and GPU12 have the largest amounts of available power.

GPU2, GPU4 and GPU21 are moderately loaded, and therefore have some intermediate amounts of available power.

GPU1 is heavily loaded, and therefore has little or no available power for new jobs.

In the present example, given this situation, network controller 36 is requested to assign a new power-intensive job that requires a group of three GPUs. One possible approach, in one embodiment, would be to assign GPU10, GPU11 and GPU12 for the new job. This assignment selects the GPUs that have the largest amounts of available electrical power.

A more power-optimal solution, in accordance with another embodiment, is to assign the new job to GPU10, GPU22 and GPU22. The latter assignment is preferable because it provides a better balance between the available powers of PDU2 and PDU3. Although GPU3 also has a large amount of available power, it should not be selected because its PDU (PDU1) is already heavily loaded.

The above scenario demonstrates a few non-limiting examples of power-aware job placement criteria. In alternative embodiments, network controller 36 may use any other suitable power-aware job placement criteria.

Figure 3:
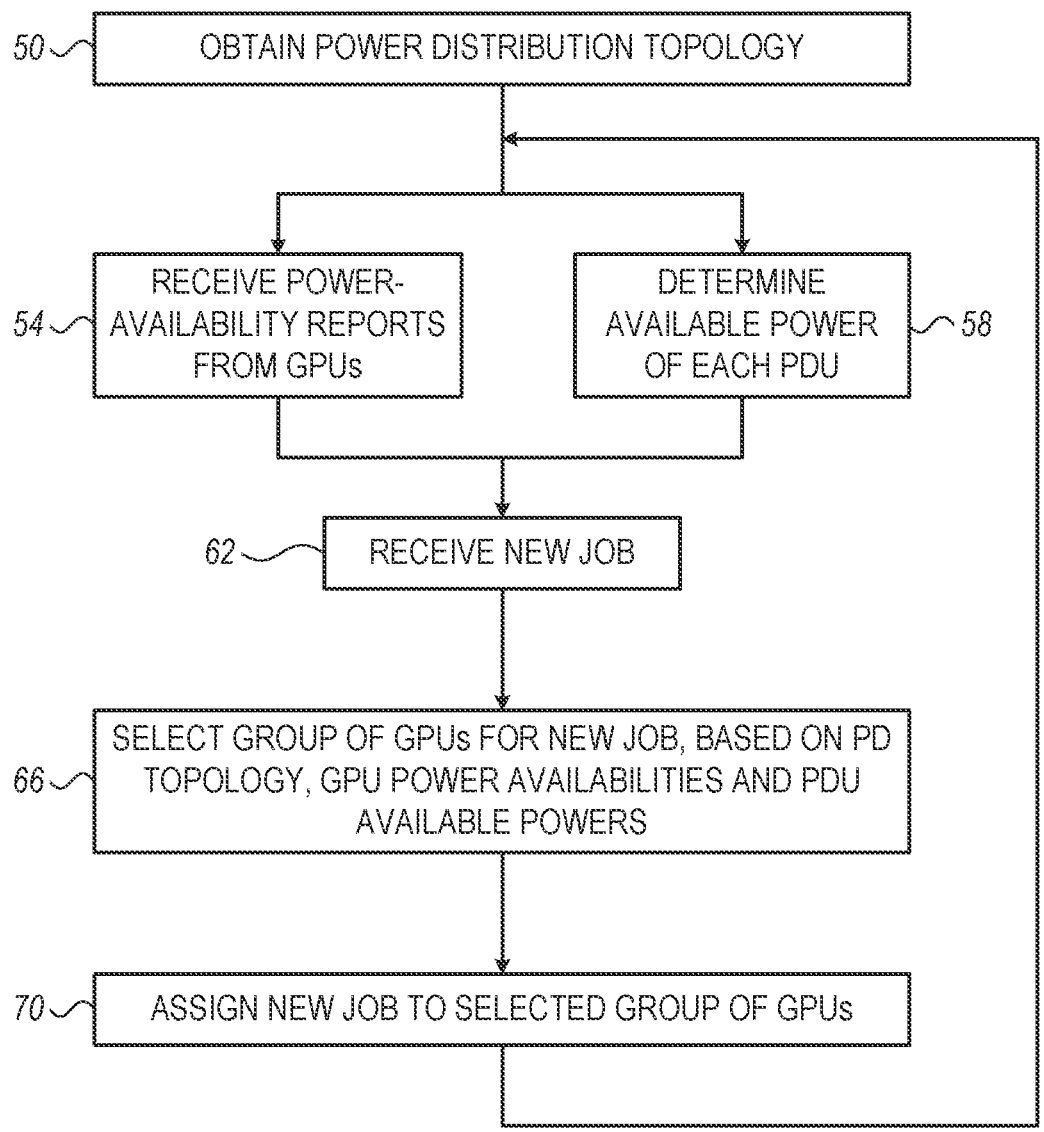
FIG. 3 is a flow chart that schematically illustrates a method for power-aware job placement, in accordance with an embodiment of the present invention.

FIG. 3 is a flow chart that schematically illustrates a method for power-aware job placement, carried out by processor 44 of network controller 36, in accordance with an embodiment of the present invention. The method begins with processor 44 obtaining the power distribution (PD) topology of system 20, at a topology input stage 50. The topology typically specifies the various power domains, e.g., which GPUs are powered by which PDU.

At a GPU availability reporting stage 54, processor 44 receives power-availability reports from the various GPUs in the system. A given availability report, sent by a given GPU, is indicative the amount of electrical power that is currently available in the GPU for executing new jobs. In an example embodiment, a given GPU reports its current power usage, from which processor 44 can deduce the amount of available power. Alternatively, a given GPU may estimate and report its available power explicitly.

At a PDU availability assessment stage 58, processor 44 determines the amount of available electrical power of each PDU. In an example embodiment, processor 44 may receive availability reports from the various PDUs. In another embodiment, processor 44 may estimate the available electrical power of a given PDU based on the power availability reports sent by the GPUs powered by the PDU.

At a job input stage 62, processor 44 receives a new job for assignment. Typically, the new job is received along with a metric that is indicative of the job's expected power demand, i.e., the amount of electrical energy needed for executing the new job. In one example embodiment, jobs are classified into several predefined power demand categories (e.g., "light", "medium" and "power intensive"). Alternatively, any other suitable metric can be used.

At a processing device selection stage 66, processor 44 selects a group of one or more GPUs for executing the new job. The selection criteria used by processor 44 is power-aware, i.e., depends at least on (i) the amounts of electrical power available in the various GPUs and (ii) the expected power demand of the new job. Typically, a prerequisite criterion is that the GPUs in the group have, in total, available power that is at least equal to the expected power demand of the new job. Additional criteria may, for example, aim to balance the power drawn from the various PDUs. The latter criterion may, for example, assign a power-intensive job to GPUs powered by different PDUs.

As part of the selection, processor 44 may select (i) the number of GPUs needed (i.e., the size of the group), and (ii) the identities of the GPUs in the group. In other embodiments, the size of the group is defined by the job itself, e.g., by the expected power demand or computational complexity of the job. In such a case processor 44 selects only the identities of the GPUs in the group.

As discussed above, the selection criteria of processor 44 may also depend on other power-related factors, such as the power distribution topology of the system and/or the available power in the various PDUs. Additionally or alternatively, the selection may depend on factors that are not power-related, e.g., availability of computational resources in the various GPUs and/or physical proximity between GPUs.

At an assignment stage 70, processor 44 assigns the new job to the selected group of GPUs. The method then loops back to stages 54 and 58 above.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A controller, comprising:
an interface, to communicate with multiple processing devices; and
a processor, to:
determine respective amounts of available electrical power that are available in the processing devices for executing jobs;
for a new job received for execution, determine an amount of electrical energy needed for executing the new job;
select a group of one or more of the processing devices for executing the new job, based at least on (i) the amounts of available electrical power that are available in the processing devices and (ii) the amount of electrical energy needed for executing the new job; and
assign the selected group to execute the new job.

2. The controller according to claim 1, wherein the processor is to determine the amounts of available electrical power by receiving power-availability reports from the processing devices.

3. The controller according to claim 1, wherein each of the processing devices is to receive electrical power from one of a plurality of Power Distribution Units (PDUs) in accordance with a power distribution topology, and wherein the processor is to select the group based also on the power distribution topology.

4. The controller according to claim 1, wherein each of the processing devices is to receive electrical power from one of a plurality of Power Distribution Units (PDUs), and wherein the processor is to select the group based also on amounts of available power of one or more of the PDUs.

5. The controller according to claim 1, wherein the new job is classified into a power demand category selected from among multiple power demand categories, and wherein the processor is to select the group based on the power demand category of the new job.

6. The controller according to claim 1, wherein the processor is to determine the amount of electrical energy needed for executing the new job by receiving, together with the new job, a metric indicative of the amount of electrical energy needed.

7. A computing system, comprising:
multiple processing devices; and
a controller, to:
determine respective amounts of available electrical power that are available in the processing devices for executing jobs;
for a new job received for execution, determine an amount of electrical energy needed for executing the new job;
select a group of one or more of the processing devices for executing the new job, based at least on (i) the amounts of available electrical power that are available in the processing devices and (ii) the amount of electrical energy needed for executing the new job; and
assign the selected group to execute the new job.

8. The system according to claim 7, wherein the controller is to determine the amounts of available electrical power by receiving power-availability reports from the processing devices.

9. The system according to claim 7, wherein each of the processing devices is to receive electrical power from one of a plurality of Power Distribution Units (PDUs) in accordance with a power distribution topology, and wherein the controller is to select the group based also on the power distribution topology.

10. The system according to claim 7, wherein each of the processing devices is to receive electrical power from one of a plurality of Power Distribution Units (PDUs), and wherein the controller is to select the group based also on amounts of available power of one or more of the PDUs.

11. The system according to claim 7, wherein the new job is classified into a power demand category selected from among multiple power demand categories, and wherein the controller is to select the group based on the power demand category of the new job.

12. The system according to claim 7, wherein the controller is to determine the amount of electrical energy needed for executing the new job by receiving, together with the new job, a metric indicative of the amount of electrical energy needed.

13. A method for assigning jobs to processing devices, the method comprising:

determining respective amounts of available electrical power that are available in the processing devices for executing jobs;

for a new job received for execution, determining an amount of electrical energy needed for executing the new job;

selecting a group of one or more of the processing devices for executing the new job, based at least on (i) the amounts of available electrical power that are available in the processing devices and (ii) the amount of electrical energy needed for executing the new job; and assigning the selected group to execute the new job.

14. The method according to claim 13, wherein determining the amounts of available electrical power comprises receiving power-availability reports from the processing devices.

15. The method according to claim 13, wherein each of the processing devices is to receive electrical power from one of a plurality of Power Distribution Units (PDUs) in accordance with a power distribution topology, and wherein selecting the group is based also on the power distribution topology.

16. The method according to claim 13, wherein each of the processing devices is to receive electrical power from one of a plurality of Power Distribution Units (PDUs), and wherein selecting the group is based also on amounts of available power of one or more of the PDUs.

17. The method according to claim 13, wherein the new job is classified into a power demand category selected from among multiple power demand categories, and wherein selecting the group is based on the power demand category of the new job.

18. The method according to claim 13, wherein determining the amount of electrical energy needed for executing the new job comprises receiving, together with the new job, a metric indicative of the amount of electrical energy needed.

* * * * *